(12) United States Patent
Corfield

(10) Patent No.: US 10,157,120 B2
(45) Date of Patent: *Dec. 18, 2018

(54) ROLE-ORIENTED TESTBED ENVIRONMENTS FOR USE IN TEST AUTOMATION

(71) Applicant: INTERNATIONAL BUSINESS MACHINES CORPORATION, Armonk, NY (US)

(72) Inventor: Gavin M. Corfield, Fremantle (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 14/857,919

(22) Filed: Sep. 18, 2015

(65) Prior Publication Data
US 2016/0004623 A1 Jan. 7, 2016

Related U.S. Application Data

(63) Continuation of application No. 13/710,418, filed on Dec. 10, 2012, now Pat. No. 9,176,852.

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3672* (2013.01); *G06F 11/3696* (2013.01)

(58) Field of Classification Search
USPC .......................................................... 714/33
See application file for complete search history.

(56) References Cited

U.S. PATENT DOCUMENTS

| 7,657,789 | B1 | 2/2010 | Gerber et al. | |
|---|---|---|---|---|
| 8,135,659 | B2 | 3/2012 | Gaffga et al. | |
| 9,164,879 | B2 * | 10/2015 | Corfield | G06F 11/3684 |
| 9,176,852 | B2 * | 11/2015 | Corfield | G06F 11/3684 |

(Continued)

OTHER PUBLICATIONS

Office Action, dated Oct. 31, 2014, U.S. Appl. No. 13/710,418, filed Dec. 20, 2012, in re Corfield.

(Continued)

*Primary Examiner* — Amine Riad
(74) *Attorney, Agent, or Firm* — Michael O'Keefe; Amy J. Pattillo

(57) ABSTRACT

A configuration manager reads a testbed description file for a particular testbed environment under test to identify multiple roles each specified by a separate role identifier. The configuration manager instantiates, for each separate role identifier defined in the test script, a separate role identifier entity referring to a separate host description file for a separate host assigned to the separate role identifier in the testbed description file. The configuration manager manages an abstraction between each separate role identifier referred to by each separate operation in the test script and each separate host currently hosting each separate role identifier for the testbed environment using the separate host description file instantiated for the separate role identifier entity for the separate host.

17 Claims, 6 Drawing Sheets

(56) References Cited

U.S. PATENT DOCUMENTS

| | | | |
|---|---|---|---|
| 2002/0055834 A1* | 5/2002 | Andrade | G06F 11/263 703/27 |
| 2003/0204784 A1* | 10/2003 | Jorapur | G06F 11/3684 714/38.14 |
| 2004/0107415 A1 | 6/2004 | Melamed et al. | |
| 2004/0205727 A1* | 10/2004 | Sit | G06F 11/3664 717/125 |
| 2005/0166094 A1* | 7/2005 | Blackwell | G06F 11/3664 714/38.14 |
| 2006/0184918 A1 | 8/2006 | Rosaria et al. | |
| 2007/0083630 A1* | 4/2007 | Roth | G06F 11/3688 709/223 |
| 2007/0083793 A1* | 4/2007 | Roth | G06F 11/3414 714/25 |
| 2007/0168971 A1 | 7/2007 | Royzen et al. | |
| 2011/0004457 A1 | 1/2011 | Haviv et al. | |
| 2014/0164841 A1 | 6/2014 | Corfield | |
| 2014/0164842 A1 | 6/2014 | Corfield | |
| 2014/0380278 A1* | 12/2014 | Dayan | G06F 11/3692 717/124 |
| 2015/0286556 A1* | 10/2015 | Ellis | G06F 11/3684 717/125 |

OTHER PUBLICATIONS

Final Office Action, dated May 7, 2015, U.S. Appl. No. 13/710,418, filed Dec. 20, 2012, in re Corfield.
Notice of Allowance, dated Jun. 24, 2015, U.S. Appl. No. 13/710,418, filed Dec. 20, 2012, in re Corfield.
Office Action, dated Oct. 31, 2014, U.S. Appl. No. 13/738,136, filed Jan. 10, 2013, in re Corfield.
Final Office Action, dated May 7, 2015, U.S. Appl. No. 13/738,136, filed Jan. 10, 2013, In re Corfield.
Notice of Allowance, dated Jun. 5, 2015, U.S. Appl. No. 13/738,136, filed Jan. 10, 2013, In re Corfield.

* cited by examiner

```
┌─────────────────────────────────────────┐  ┌─ ─ ─ ─ ─ ─ ─ ─ ─ ─ ─ ─ ─ ─ ─ ─ ─ ┐
│ ROLE-ORIENTED CONFIGURATION FILES 202   │    TB64 TESTBED ROLES:
│                                         │    MQSERVERHOST1
│ ┌─────────────────────────────────────┐ │    MQSERVERHOST2
│ │ TESTBED=RT_RH564                    │ │    TTASHOST1
│ │                                     │ │    TTASHOST2                208
│ │ TB64.MQSERVERHOST1=HP80TEST         │ │  └ ─ ─ ─ ─ ─ ─ ─ ─ ─ ─ ─ ─ ─ ─ ─ ─ ┘
│ │ TB64.MQSERVERHOST2=IBMX3250TEST01   │ │  ┌ ─ ─ ─ ─ ─ ─ ─ ─ ─ ─ ─ ─ ─ ─ ─ ─ ┐
│ │ TB64.TTASHOST1=IBMX3250TEST09   204 │ │    ENTITIES REPRESENTING THE ROLES:
│ │ TB64.TTASHOST2=IBMX3250TEST09       │ │    MQSERVERHOST1 = HP80TEST
│ └─────────────────────────────────────┘ │    MQSERVERHOST2 = IBMX3250TEST01
│                                         │    TTASHOST1=IBMX3250TEST09
│ ┌─────────────────────────────────────┐ │    TTASHOST2=IBMX3250TEST09    210
│ │ HP80TEST.PROPS                      │ │  └ ─ ─ ─ ─ ─ ─ ─ ─ ─ ─ ─ ─ ─ ─ ─ ─ ┘
│ │ IBMX3250TEST01.PROPS                │ │
│ │ IBMX3250TEST09.PROPS            206 │ │
│ └─────────────────────────────────────┘ │
└─────────────────────────────────────────┘
```

```
CONFIGURATION MANAGER INSTANTIATES ENTITIES FOR SERVER ROLES:

mTtasSvr1 = this.getConfig().getHost (TTASHOST1);
mTtasSvr2 = this.getConfig().getHost (TTASHOST2);
mMQSvrHost = this.getConfig().getHost(MQSERVERHOST1)              220
```

```
CONFIGURATION MANAGER MANAGES THE ABSTRACTION BETWEEN SERVER ROLE
ENTITIES AND HOSTS:

try
{   ttas1MaxidT0 = eventStaf.getMaxId(mTtasSvr1, mMQSvrHost);
}
catch (Exception e)
{
    ttas1MaxidT0 = 0;                                              230
}
```

```
ALL VALUES CAN BE ENCAPSULATED FOR THIS TESTBED CONFIGURATION:

Config config = new Config()
String value = config.getValue(MYPARAM)

or String hostvalue = config.getHostValue(MYPARAM, HOSTNAME)       240
```

*FIG. 2*

HP80TEST.PROPS

Name=HP80TEST     302
SystemName=HP80TEST
Address=XXX.XX.X.X
OS=Unix
StafServiceDir=/localdirectory/

\# Installer Props
TTcomponents=th
kitDir=/tmp/kit/
tmpDir=/tmp/
TEMS=(TEMS)
toCfgFile="value"
tuCfgFile="value"
TH_QMGR_LIST=HP80TEST.QM1,HP80TEST.QM2
logPath=targetmachine/logs/
ttarmBitness=XX
ttapiBitness=XX
\# End of Installer Props DisableStafPush=true
fqdn=hp80test.isonet.perth.micromuse.com
QueueManager=HP80TEST.QM1
Queue=HP80TEST.QM1.LQ3
QueueManager1=HP80TEST.QM1
QueueManager1.LQueue1=HP80TEST.QM1.LQ1
tuAMEfgDir//opt/IBM/ITM/tmaitm6/camconfig/TU
QueueManager1.AQueue1=HP80TEST.QM1.AQ1
QueueManager1.AQueue1.TargetQueue=
    HP80TEST.AM1.LQ2
QueueManager1.LQueue5=HP80TEST.QM1.LQ5
QueueManager1.LQueue6=HP80TEST.QM1.LQ6
QueueManager1.LQueue7=HP80TEST.QM1.LQ7
QueueManager1.LQueue9=HP80TEST.QM1.LQ9

Topic1=/title/subject
QueueManager1.LQueue1=HP80TEST.QM1.LQ1
QueueManager1.LQueue1=HP80TEST.QM1.LQ001
QueueManager1.RQueue1=HP80TEST.QM1.RQ001
QueueManager1.RQueue1.XMITQ=MCA.1.XMITQ
QueueManager1.LQueue2=HP80TEST.QM1.LQ002
QueueManager1.RQueue2=HP80TEST.QM1.RQ002
QueueManager1.RQueue2.XMITQ=MCA.2.XMITQ
QueueManager1.LQueue3=HP80TEST.QM1.LQ003
QueueManager1.RQueue3=HP80TEST.QM1.RQ003
QueueManager1.RQueue3.XMITQ=MCA.3.XMITQ QueueManager1.RQueue4=HP80TEST.QM1.RQ004
QueueManager1.RQueue4.XMITQ=MCA.4.XMITQ
QueueManager1.LQueue4=HP80TEST.QM1.LQ004
QueueManager1.RQueue5=HP80TEST.QM1.RQ005
QueueManager1.RQueue5.XMITQ=MCA.5.XMITQ Port=XXXX
Channel=SYSTEM.DEF.SVRCONN WASPort=XXXX
JDBCComp=JDBC:DB2/AIX64:SQL08020
jdbcURL="URL value"
WASServerName="server name"
250test08Node01.server1

TtasDbFile=/directoryPath1/
TtasHostName=hp80test
TtasHostAddress=hp80test

ClusterQueueManager=HP80TEST.QM2
ClusterLocalQueue=HP80TEST.QM2.LCQ001
ClusterAliasQueue=HP80TEST.QM2.ACQ001
ClusterRemoteQueue=AIX09TEST.QM2.RCQ001
ClusterQueue=HP80TEST.QM2.CQ001

ClusterTransmitQueue=SYSTEM.CLUSTER.TRANSM
IT.QUEUE
MCAClusterTargetQueue=HP80TEST.QM2.LQ001
MCAClusterQueueManager=HP80TEST.QM2
ClusterTestRemoteQueue=HP80TEST.QM2.RQ001
ClusterPort=XXXX VCtxServerName=hp80test ITMName=hp80test
jrel_4Home=/directoryPath2/
jrel_5Home=/directoryPath3/
tuAMCECfgDir=/directoryPath4/
ttapiARMBinPath=/directoryPath5/
ttapicBinPath=/directoryPath6
RTtasHostName=aix09test
RTtasHostAddress=aix09test
RTtasDbFile=/filepath/

*FIG. 3*

ROLE-ORIENTED TESTBED ENVIRONMENTS FOR USE IN TEST AUTOMATION

CROSS REFERENCE TO RELATED APPLICATIONS

This application is a continuation of commonly assigned U.S. patent application Ser. No. 13/710,418, filed Dec. 10, 2012, which is hereby incorporated herein by reference.

BACKGROUND

1. Technical Field

The embodiment of the invention relates generally to test automation and particularly to managing testbed environments as role-oriented testbed environments for use in test automation.

2. Description of the Related Art

Test automation refers to the use of test software, or a test script, separate from the software being tested, to control the execution of the test on the software being tested. The software being tested, and the platform upon which the tested software runs, is referred to as a testbed environment. In a distributed software environment of multiple autonomous software components running on one or more systems that communicate with one another, the testbed environment for a distributed software environment is a complex environment, where the more complex the testbed environment, the greater the time overhead associated with coding test software to test the test bed environment.

Test automation software that is parameter-based uses single variables in the code for the test software to control logic flow of the test software on a particular configuration of host platforms in a particular testbed environment. Coding a parameter-based test automation to run on a particular configuration of host platforms of a distributed software environment, using single variables to control logic flow for the test software referring to specific host platforms, requires a significant number of parameters and complex procedural scripting, and results in test software that is inflexible for testing the software components distributed across different host platforms and test software that is difficult to maintain in response to changes within the testbed environment.

BRIEF SUMMARY

In view of the foregoing, there is a need for a method, system, and computer program product for defining test bed environments as role-oriented testbed environments for use in test automation to allow test scripts to call roles, rather than single variables specifying host platforms, when testing a distributed software environment, to provide flexible, maintainable test software.

In one embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to read, responsive to load of a test script, a testbed description file for a particular testbed environment under test to identify a plurality of roles each specified by a separate role identifier of a plurality of role identifiers in the testbed description file and to identify one or more hosts from among a plurality of hosts assigned to each of the plurality of roles, wherein in the test script each separate operation refers to the separate role identifier only. The stored program instructions comprise program instructions to manage an interface through which a user views a logical view of the particular testbed environments displaying the plurality of hosts assigned to each of the plurality of roles. The stored program instructions comprise program instructions, in response to a user selection within the interface to adjust the logic view of a particular host from among the plurality of hosts assigned to a particular role from among the plurality of roles, to adjust the testbed description file to assign the particular host to the particular role. The stored program instructions comprise program instructions to instantiate, for each separate role identifier defined in the test script, a separate role identifier entity referring to a separate host description file for a separate host from among the plurality of hosts assigned to the separate role identifier in the testbed description file. The stored program instructions comprise program instructions to manage, responsive to execution of the test script by an automation executor on the testbed environment, an abstraction between each separate role identifier referred to by each separate operation in the test script and each separate host currently hosting each separate role identifier for the testbed environment using the separate host description file instantiated for the separate role identifier entity for the separate host.

In another embodiment, a method is directed to a computer system reading, responsive to load of a test script, a testbed description file for a particular testbed environment under test to identify a plurality of roles each specified by a separate role identifier of a plurality of role identifiers in the testbed description file and to identify one or more hosts from among a plurality of hosts assigned to each of the plurality of roles, wherein in the test script each separate operation refers to the separate role identifier only. The method is directed to the computer system managing an interface through which a user views a logical view of the particular testbed environments displaying the plurality of hosts assigned to each of the plurality of roles. The method is directed to the computer system, in response to a user selection within the interface to adjust the logic view of a particular host from among the plurality of hosts assigned to a particular role from among the plurality of roles, adjusting the testbed description file to assign the particular host to the particular role. The method is directed to the computer system instantiating, for each separate role identifier defined in the test script, a separate role identifier entity referring to a separate host description file for a separate host from among the plurality of hosts assigned to the separate role identifier in the testbed description file. The method is directed to the computer system managing, responsive to execution of the test script by an automation executor on the testbed environment, an abstraction between each separate role identifier referred to by each separate operation in the test script and each separate host currently hosting each separate role identifier for the testbed environment using the separate host description file instantiated for the separate role identifier entity for the separate host.

In another embodiment, a computer program product comprises one or more non-transitory computer-readable storage devices and program instructions, stored on at least one of the one or more storage devices. The stored program instructions comprise program instructions to read, responsive to load of a test script, a testbed description file for a particular testbed environment under test to identify a plurality of roles each specified by a separate role identifier of a plurality of role identifiers in the testbed description file and to identify one or more hosts from among a plurality of hosts assigned to each of the plurality of roles, wherein in the test script each separate operation refers to the separate role identifier only. The stored program instructions comprise program instructions to manage an interface through which a user views a logical view of the particular testbed environments displaying the plurality of hosts assigned to each of the plurality of roles. The stored program instructions comprise program instructions, in response to a user selection within the interface to adjust the logic view of a particular host from among the plurality of hosts assigned to a particular role from among the plurality of roles, to adjust the testbed description file to assign the particular host to the particular role. The stored program instructions comprise program instructions to instantiate, for each separate role identifier defined in the test script, a separate role identifier entity referring to a separate host description file for a separate host from among the plurality of hosts assigned to the separate role identifier in the testbed description file. The stored program instructions comprise program instructions to manage, responsive to execution of the test script by an automation executor on the testbed environment, an abstraction between each separate role identifier referred to by each separate operation in the test script and each separate host currently hosting each separate role identifier for the testbed environment using the separate host description file instantiated for the separate role identifier entity for the separate host.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 2 illustrates one example of a block diagram of a test automator referencing a testbed by roles;

FIG. 3 illustrates one example of a listing of data included in a host system description file included in role-oriented configuration files for a testbed;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
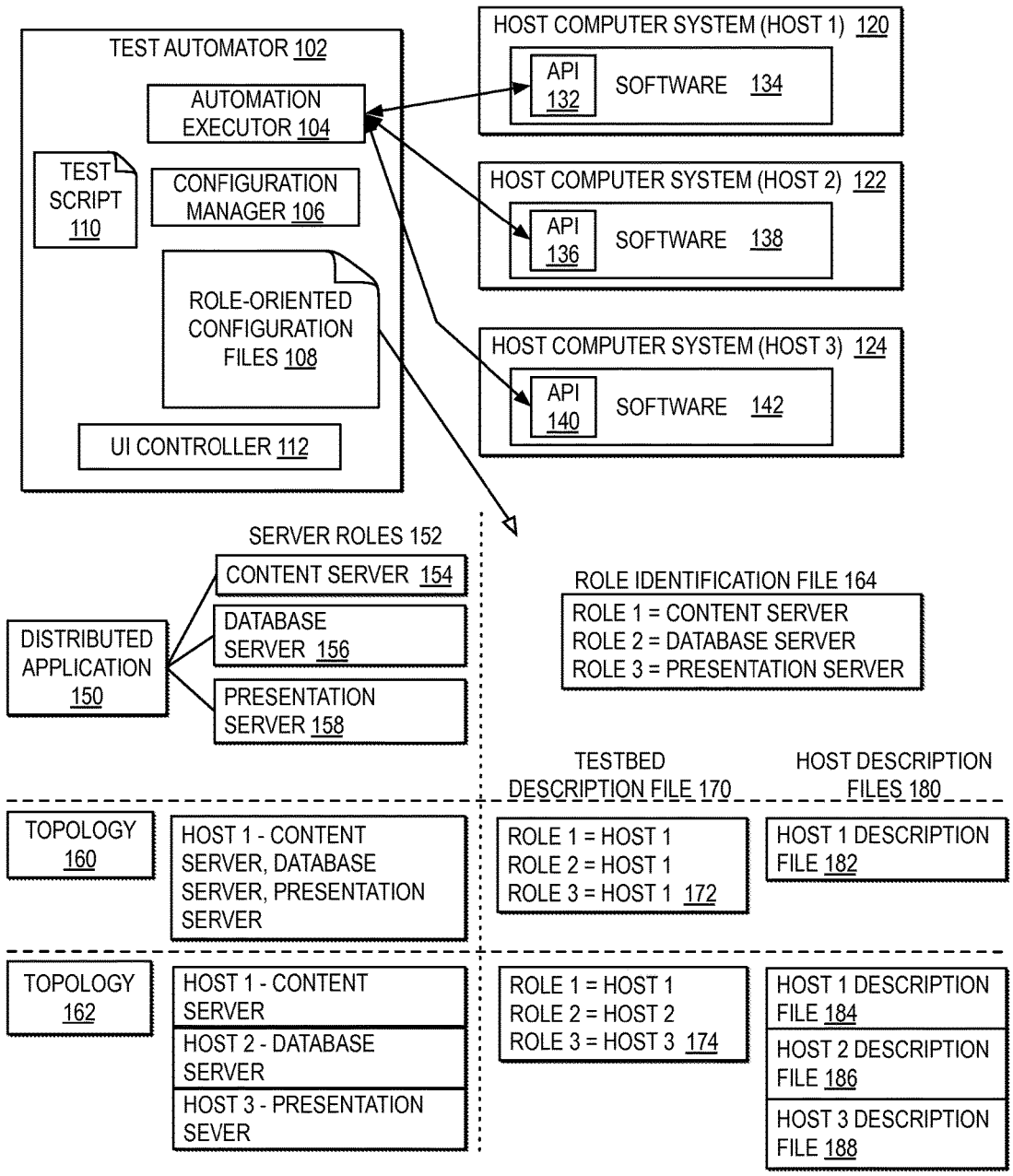
FIG. 1 illustrates one example of a block diagram of a test automator using a role-oriented testbed environment.

FIG. 1 illustrates a block diagram of one example of a test automator using a role-oriented testbed environment. In the example, a test automator 102 includes an automation executor 104 for automating running one or more test scripts 110 on one or more host computer systems. In the example, multiple host computer systems are illustrated as a host computer system 120, a host computer system 122, and a host computer system 124. In the example, each host computer system includes software, which may be tested by automation executor 104, and the software may include one or more application programming interfaces (APIs) called by automation executor 104 as the interface for executing tests on the software. In the example, host computer system 120 includes software 134, with at least one API 132, host computer system 122 includes software 138, with at least one API 136, and host computer system 124 includes software 142, with at least one API 140.

In the example, each of host computer system 120, host computer system 122 and host computer system 124, while running software that may be under test by automation executor 104, do not have any component of test script 110 or any other testing software used by test automator 102, running on the host computer systems. For each of host computer system 120, host computer system 122, and host computer system 124, the interactions between test automator 102 and each of the host systems is performed by automation executor 104 with the API appropriate to drive the software under test, and not by automation executor 104 calling any separate testing software on any of the host computer systems. In the example, automation executor 104 interacts with one or more APIs of the software implemented on each host computer system, such as API 130, API 132, and API 134, to run operations of test script 110 on the software implemented on each host computer system.

In the example, a distributed application 150 may include software, that when operating on a computer system, enables the computer system to perform or one more roles, such as server roles 152 of a content server 154, a database server 156, and a presentation server 158. In other embodiments, distributed application 150 may enable additional or alternate types of roles under server roles 152. Server roles may also represent domains or middleware software layers that run in a layer above an operating system platform and support one or more transactional application programs. In one example, the server role of presentation server 158 may be implemented through a distributed WebSphere® Application Server (WAS), the server role of content server 154 may be implemented through an application service provider, including, but not limited to a Websphere® MQ® messaging server, and the server role of database server 156 may implement a backend to a database, such as DB2® running on a Z/OS® backend.

In the example, in one topology example illustrated at reference numeral 160, when implemented, server roles 152 of distributed application 150 may be distributed across a single host computer system, such as host computer system (HOST 1) 120, wherein software 134 represents multiple autonomous software components that when operating on host computer system 120, enable host computer system 120 to operate server roles 152 of content server 154, database server 156, and presentation server 158. In another topology example, illustrated at reference numeral 162, distributed application 150 may be distributed across multiple host computer systems, such as host computer system 120 (HOST 1), host computer system (HOST 2) 122, and host computer system (HOST 3) 124, wherein software 134 represents software components that when operating on host computer system 120, enable host computer system 120 to operate in the server role of content server 154, wherein software 138 represents software components that when operating on host computer system 122, enable host computer system 122 to operate in the server role of database server 156, and wherein software 142 represents software components that when operating on host computer system 124, enable host computer system 124 to operate in the server role of presentation server 158. In other embodiments, server roles 152 of distributed application 150 may be hosted by one or more host computer systems in additional or alternate topologies.

In the example, test automator 102 includes a configuration manager 106 for managing access to one or more role-oriented configuration files 108. In the example, role-oriented configuration files 108 identify and define one or more testbeds from the perspective of the one or more server roles for one or more distributed applications present in the one or more testbeds. In the example, role-oriented configuration files 108 include one or more of a role identification file 164 for identifying and defining each of the server roles of a distributed application under test, a testbed description file 170 for identifying the host computer systems currently assigned to each server role for a particular testbed, and host description files 180 for describing each host computer system. In additional or alternate examples, role-oriented configuration files 108 may include additional or alternate types of files.

Role identification file 164 identifies and defines a role variable for each type of server role of a distributed application included in a testbed, independent of any host system on which the distributed application is running In the example, role identification file 164 reflects server role 152 of distributed application 150, and an assignment of "ROLE 1" to the server role of content server 154, an assignment of "ROLE 2" to the server role of database server 156, and an assignment of "ROLE 3" to the server role of presentation server 158.

Testbed description file 170 identifies and defines, for a testbed, the one or more host computer systems currently hosting each server role for the testbed. The assignments illustrated at reference numerals 172 and 174 illustrates examples of different server role assignments that may be assigned to reflect the current topology of a testbed. The example illustrated at reference numeral 172 reflects the server role assignments for distributed application 150 when distributed in the topology illustrated at reference numeral 160, wherein ROLE 1, ROLE 2, and ROLE 3 are assigned to HOST 1. The example illustrated at reference numeral 174 reflects the server role assignments for distributed application 150 when distributed in the topology illustrated at reference numeral 162, wherein ROLE 1 is assigned to HOST 1, ROLE 2 is assigned to HOST 2, and ROLE 3 is assigned to HOST 3.

Host description files 180 define, for each host referred to in testbed description file 170, a description of the host computer system with the data required to interact with the server roles hosted by the host computer system through values and concrete descriptors. In the example, for topology 160, host description files 180 may include a HOST 1 description file 182 that contains the data required to interact with a content server, a database server, and a presentation server. In the example, for topology 162, host description files 180 may include a HOST 1 description file 184 that contains the data required to interact with a content server, a HOST 2 description file 186 that contains the data required to interact with a database server, and a HOST 3 description file 188 that contains the data required to interact with a presentation server.

In the example, a configuration manager 106 manages defining role-oriented testbed is role-oriented configuration files 108. In one example, a user specifies the values in one or more of testbed description file 170 and host description files 180 for a testbed by specifying the text in each of the files. In another example, configuration manager 106 may access values in one or more of testbed description file 170 and host description files 180 through user selections entered through a graphical user interface managed by a UI controller 112. In another example, configuration manager 106 may access a current topology mapping of a testbed from an external management service for an environment supporting distributed application 150, such as the IBM Tivoli Composite Application Manager (ITCAM) which identifies a topology of a distributed application environment by server roles and host systems or that identifies host system values within a distributed application environment, and configuration manager 106 may automatically define a testbed by server role in testbed description file 170 from the values supplied by the external management service or automatically generate host description files 180 from the host system values supplied by the external management service.

In the example, configuration manager 106 manages, on execution of test script 110 by automation executor 104, the abstraction between the server roles referred to in test script 110 and the host computer systems currently hosting the server roles for a testbed. In one example, configuration manager 106, on load of test script 110, reads the testbed description file 170 for the particular testbed under execution to identify the server roles and to identify the one or more host computer systems currently assigned to the server roles, reads the one or more host description files 180 for the particular testbed, and instantiates entities as defined in test script 110 for each server role using the particular host description file from host description files 180 for the host assigned to each server role. When test script 110 requests performance of an operation on a server role entity, automation executor 104 manages the logical layer between test script 110 and the particular testbed, using the instantiated entity for the server role, to properly access the host description data for the host assigned to the server role to send calls to one or more APIs at an identified host computer system assigned to the server role of the particular testbed.

In the example, test script 110 may include instructions that reference one or more of the server roles defined within role-oriented configuration files 108 for a testbed. By using instructions within test script 110 that reference one or more of the server roles defined within role-oriented configuration files 108 for a testbed, a same test script 110 may be written for automation executor 104 to run on any distributed application with the particular set of server roles defined in role-oriented configuration files 108, regardless of the topology of the host computer systems on which the distributed application runs. By test script 110 referring to server roles of a distributed application under test, rather than using parameters that reference specific host computer systems across which a distributed application runs, test script 110 is flexible and can be run by automation executor 104 to test distributed applications with a same set of server roles running on many different host computer systems and on many different host computer system topologies, where only role-oriented configuration files 108 need to be updated reflect the roles assigned to different host computer systems and the descriptions of different host computer systems. By test script 110 referring to server roles of a distributed application under test, if changes are made to the one or more of the underlying host computer systems hosting the distributed application, only role-oriented configuration files 108 need to be updated to reflect the changes to the underlying host computer systems, not test script 110.

In contrast, if test script 110 includes parameters referencing one or more host computer systems hosting the software under test, rather than referencing one or more server roles defined in role-oriented configuration files 108, while test script 110 would be executable by automation executor 104 without management by configuration manager 106, test script 110 is only executable by automation executor 104 on the selection of one or more host computer systems defined and described in test script 110, a separate version of test script 110 must be coded for each separate testbed of one or more selected host computer systems on which a distributed application under test is configured to run, and each separate version of test script 110 generated for each separate testbed would have to be updated to reflect any changes to underlying host systems. In addition, if test script 110 includes parameters referencing one or more host computer systems, rather than referencing one or more server roles defined in role-oriented configuration files 108, test script 110 also includes scripts and other code, specific to a particular host computer system, that increases the size and complexity of test script 110, which also has to be separate coded for each separate testbed of one or more selected host computer systems on which a distributed application under test is configured to run.

In the example, role-oriented configuration files 108 is illustrated within test automator 102, however, role-oriented configurations files 108 may be logically or physically located in one or more locations accessible to test automator 102 and may be accessed by multiple test automators. In one example, role-oriented configuration files 108 are located in a predefined centralized storage location accessible to one or more test automators and role-oriented configuration files 108 may include files for one or more testbeds. In addition, test automator 102 may access different selections of the files within role-oriented configuration files 108 from different storage locations.

In the example, test automator 102 may also include user interface (UI) controller 112. UI controller 122 manages a testbed environment defined by role-oriented configuration files 108 by providing one or more types of views of the testbed including, but not limited to, a logical view of the testbed and values assigned to individual hosts in the testbed. In addition, UI controller 122 may manage one or more interfaces through which a user may select one or more values within role-oriented configurations files 108 and through which a user may view and interact with results generated by test automator 102.

FIG. 2 illustrates a block diagram of an example of a test automator referencing a testbed by roles.

In the example, test automator 102 accesses role-oriented configuration files 202, which include, but are not limited to, a testbed description file 204 and host description files 206.

In the example, testbed description file 204 defines a testbed named "RT_RH564". As illustrated at reference numeral 208, the TB62 testbed server roles include "MQSERVERHOST1", "MQSERVERHOST2", "TTASHOST1", and "TTASHOST2". In one example, server roles "MQSERVERHOST1" and "MQSERVERHOST2" each represent server roles of application service providers providing message oriented middleware, such as through a Websphere® MQ® messaging server, and server roles "TTASHOST1" and "TTASHOST2" each represent server roles of transaction collectors, such as through a Transaction Tracking API server (TTAS). As illustrated at reference numeral 210, a host "HP80TEST" is assigned to the server role "MQSERVERHOST1", a host "IBMX3250TEST01" is assigned to the server role "MQSERVERHOST2", a host "IBMX3250TEST09" is assigned to the server role "TTASHOST1", and a host "IBMC3250TEST09" is assigned to the server role "TTASHOST2". As illustrated in testbed description file 204, the testbed roles and entity assignments to the testbeds are reflected by the entries of "TB64.MQSERVERHOST1=HP80TEST". "TB64.MQSERVERHOST2=IBMX3250TEST01", "TB64.TTASHOST1=IBMX3250TEST09", and "TB64.TTASHOST2=IBMX3250TEST09".

In the example, host description files 206 includes a description file for host "HP80TEST" named "HP80TEST.PROPS", a description file for host "IBMX3250TEST01" named "IBMX3250TEST01.PROPS", and a description file for host "IBMX3250TEST09" named "IBMX3250TEST09.PROPS".

In the example, automation executor 104 executes test script 110 and sends API calls to instances of the distributed application across one or more hosts by server role, with configuration manager 106 managing the abstraction between server roles referred to in test script 110 and hosts assigned to server roles based on testbed role-oriented configuration files 202. In the example, test script 110 refers to testbed "RT_RH564, therefore configuration manager 106 reads testbed description file 204 and instantiates instances of each server role, as entities defined in test script 110, based on host description files 206, for the current execution of test scrip 110. For example, as illustrated at reference numeral 220, configuration manager 106 may instantiate an entity for server role TTASHOST1 named mTtasSvr1 using the command "mTtasSvr1=this.getConfig( ).getHost (TTASHOST1), triggering configuration manager 106 to create an instance of mTtasSvr1 referring to the server role "TTASHOST1", which is hosted by host" IBMX3250TEST09", using the host description file of "IBMX3250TEST09.PROPS" for host "IBMX3250TEST09" based on testbed role-oriented configuration files 202. In another example illustrated at reference numeral 220, configuration manager 106 may instantiate an entity for server role TTASHOST2 named mTtasSvr2 using the command "mTtasSvr2=this.getConfig( ).getHost (TTASHOST2), triggering configuration manager 106 to create an instance of mTtasSvr2 referring to the server role "TTASHOST2", which is also hosted by host "IBMX3250TEST09", using the host description file of "IBMX3250TEST09.PROPS" for host "IBMX3250TEST09" based on testbed role-oriented configuration files 202. In another example illustrated at reference numeral 220, configuration manager 106 may instantiate an entity for the server role MQSERVERHOST1 named mMQSvrHost using the command "mMQSvrHost=this.getConfig( ).getHost (MQSERVER-HOST1), triggering configuration manager 106 to create an instance of mMQSvrHost referring to the server role "MQSERVERHOST1", which is hosted by host "HP80TEST" using the host description file of "HP80TEST.PROPS" for host "HP80TEST" based on testbed role-oriented configuration files 202. By instantiating entities for server roles on load of a testbed, the entities are available for use for managing the abstraction between server roles and hosts for the current execution of test script 110 on the testbed.

In the example, after instantiating entities for each of the server roles, automation executor 104 may run tests from test script 110 on the testbed by acting on these server role entities as illustrated at reference numeral 230. For example, for a command of "try {ttas1MaxidT0=eventStaf.getMaxId (mTtasSvr1, mMQSvrHost);} catch (Exception e){ttas1MaxidT0=0;}", configuration manager 106 manages the abstraction between the server role entity "mTtasSvr1" for server role "TTASHOST1" using the values in host description file "IBMX3250TEST09" and manages the abstraction between the server role entity "mMQSvrHost" for server role "mQServerHost1" using the values in host description file ""HP80TEST". By test script 110 referring to server roles through server role entities, and automation executor 104 enabled to act on server role entities through management of the server roles and associated hosts by configuration manager 106, the code in test script 110 is simplified to refer to server roles, independent of any topology hosts of the software performing the server roles. If the topology of hosts assigned to the server roles for a testbed changes or the values in the definition of a particular host changes, only testbed role-oriented configuration file 202 needs to be changed to reflect the changes, not test script 110, making test script 110 flexible for use across testbeds with a same set of server roles distributed across host systems configured in different topologies.

In the example, as illustrated at reference numeral 240, since all the values of a testbed configuration are defined in testbed role-oriented configuration files 202, rather than within test script 110, all the values of a testbed configuration can be encapsulated using simple commands such as "Config config=new Config( ); String value=config.getValue(MYPARAM);" or "String hostValue=config.getHostValue(MYPARAM, ROLE NAME)" and if the product function changes it is easier to refactor the code to accommodate the changes. In the example, the value "MYPARAM" may represent whatever value is required, such as "tmpDir", where the simple commands used would read "String value=config.getValue ("tmpDir")" and "String hostValue=config.getHostValue ("tmpDir", TTASHOST1)". In contrast, if test script 110 were parameter-based and used single variables referring to hosts, the values of a testbed configuration would not be encapsulated, leading to verbose procedural scripts for each host included within test script 110, which would make test script 110 inflexible and difficult to maintain.

FIG. 3 illustrates a block diagram of an example of data included in a host system description file included in role-oriented configuration files for a testbed. In the example, host system description file 302 includes configuration data for a host system. In one example, host system description file 302 is named "HP80TEST.PROPS" and illustrates examples of configuration data for a host system "HP80TEST" referred to in FIG. 2. The configuration data included in host system description file 302 may include multiple types of data including, but not limited to, a host name, a system name, a network address of the host system, an operating system operating on the host system, a location of one or more directories on a host system, one or more installation properties of a host system, credentials for applications, ports for network services, and one or more commands to communicate with APIs running on a host system implemented by the software for the server roles hosted on the host system. Referring back to the examples illustrated at reference numeral 240, all the values of host system description file 302, and other host system description files within role-oriented configuration files 202, may be encapsulated using a simple configuration command, and kept separate from test script 110.

Figure 4:
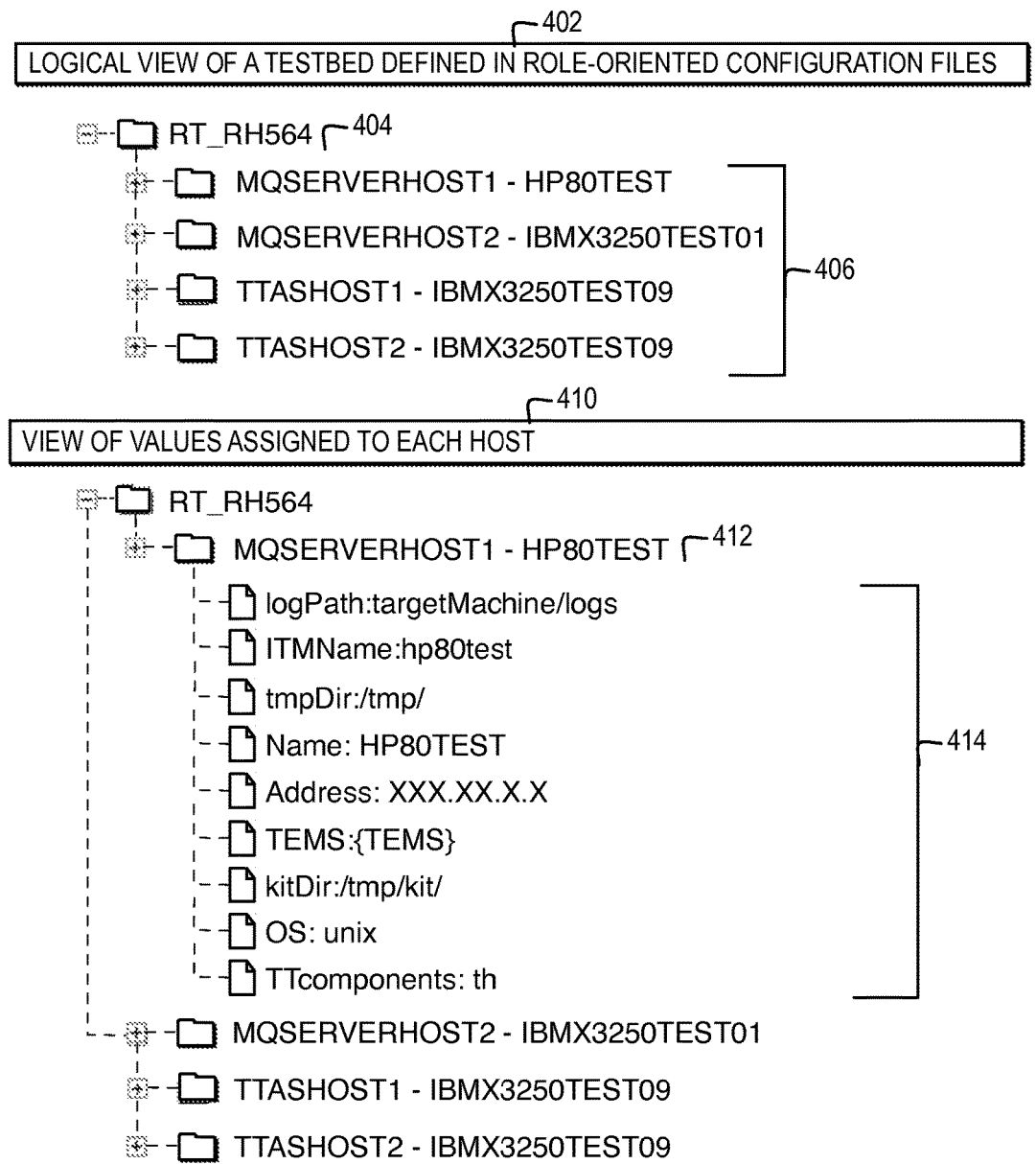
FIG. 4 illustrates examples of a graphical user interface views of a testbed based on role-oriented configuration files.

FIG. 4 illustrates examples of graphical user interface views of a testbed based on role-oriented configuration files. In the example, UI controller 112 may control a user interface in which a user may view the contents of role-oriented configuration files 108 in one or more views. In the examples illustrated, UI controller 112 provides a view of the contents of role-oriented configuration files 108 logically organized in a file display structure. In other examples, UI controller 112 may provide a view of the contents of role-oriented configuration files 108 organized in one or more other types of display structures.

In the example, a view 402 includes a logical view of a testbed defined in role-oriented configuration files. In the example, the testbed named "RT_RH564" is illustrated by a folder 404. Folder 404 is opened, and as illustrated at reference numeral 406, a separate folder is illustrated for each of the server roles assigned to the testbed in testbed description file 204 and of the host assigned to each server role. As illustrated at reference numeral 406, a separate folder identifies each of the server role and host assignments in testbed description file 204, illustrated as a folder named "MQSERVERHOST1—HP80TEST", a folder named "MQSERVERHOST2—IBMX3250TEST01", a folder named 'TTASHOST1—IBMX3250TEST09", and a folder named 'TTASHOST2—IBMX3250TEST09".

In the example, a view 410 includes a view of the values assigned to each host assigned to each server role from the one or more host description files. In the example, folder 412 identifying server host "HP80TEST" is opened, and as illustrated at reference numeral 414, a separate file is illustrated for one or more of the values assigned to the host in host description file 302 in the form of name value pairs, which are represented by "name:value" As illustrated at reference numeral 414, a separate file identifies a selection of examples of the values assigned to the host including a variable named "logPath", which has a value of "targetMachine/logs/", a variable named "ITMName", which has a value of "hp80test", a variable named "tmpDir:" which as a value of "tmp/", a variable named "Name", which has a value of "HP80TEST", a variable named "Address", which has a value of "XXX.XX.X.X", a variable named "TEMS", which has a value of "TEMS}", a variable named "kitDir", which has a value of "/tmps/kit/", a variable named "OS", which has a value of "unix", and a variable named "TTcomponents", which has a value of "th". While in the example each file in the form of a name value pair is represented by a graphical file illustrated in a graphical user interface, in other embodiments, in additional or alternate embodiments, the name value pairs may be output in other formats within a graphical user interface or within other types of interfaces.

In the example, a user may select to adjust the folders under folder 404 using one or more commands or graphical user interface tools, for example by adding a new server role and host assignment to the testbed by selecting to add a new folder under folder 404 and naming the folder with the new server role and host identifiers, by adjusting a server role or host assignment to the testbed by adjusting the names assigned to a folder under folder 404, or by removing a server role and host assignment of the testbed by deleting a folder under folder 404. In the example, a user may select to adjust the files under folder 412, for example by adding a new value to a host by selecting to add a new file under folder 412 and naming the file with the new value, by adjusting a host value by adjusting the name assigned to a file under folder 412, or by removing a host value by deleting a file under folder 412. In one example, UI controller 112 directs configuration manager 106 to adjust the contents of role-oriented configuration files 108 based on user changes to the folders displayed under view 402 and based on user changes to the files displayed under view 410.

Figure 5:
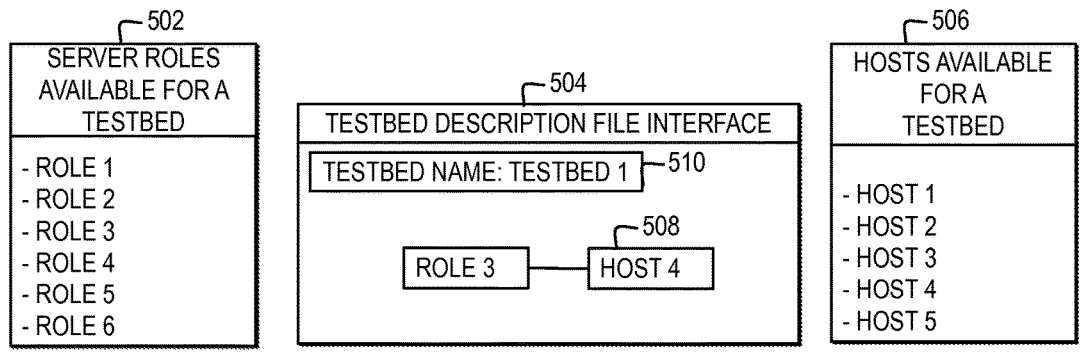
FIG. 5 illustrates an example of a graphical user interface for selecting the role-oriented components of a testbed.

FIG. 5 illustrates an example of a graphical user interface for selecting the role-oriented components of a testbed. In the example, a monitoring service may track the server roles available in a distributed environment and may track the topology of hosts available in a distributed environment. In the example, UI controller 112 may enable an interface, such as interface 500, in which the tracked server roles are selectively displayed, as illustrated at reference numeral 502 and in which the tracked hosts are selectively displayed, as illustrated at reference numeral 506. A user may selectively move displayed roles from selectable role list 502 to a testbed description file interface 504 and selectively move displayed hosts from selectable host list 506, to associate with one or more server roles. In the example, as illustrated at reference numeral 508, a user has selectively moved a server role "role 3" to testbed description file interface 504 and has selectively moved a host "host 4" to associate with server role "role 3" in testbed description file interface 504. In one example, UI controller 112 directs configuration manager 106 to define the contents of role-oriented configuration files 108 based on the graphical associations made by the user within testbed description file interface 510.

As illustrated at reference numeral 510, a user may specify the name of a testbed. In one example, a user may select to open testbed description file interface 504 for an existing testbed definition or a user may select to start a new testbed definition.

Figure 6:
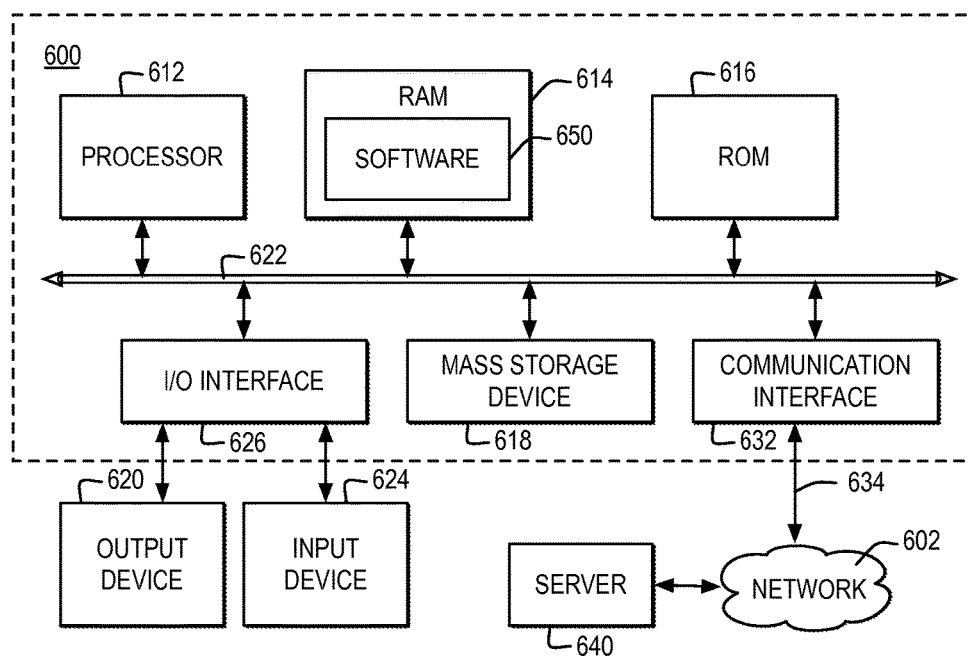
FIG. 6 illustrates one example of block diagram of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to computer system 5600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power. Where multiple processors share bus 622, additional controllers (not depicted) for managing bus access and locks may be implemented.

Processor 612 may be at least one general-purpose processor such as IBM® PowerPC® processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Figure 7:
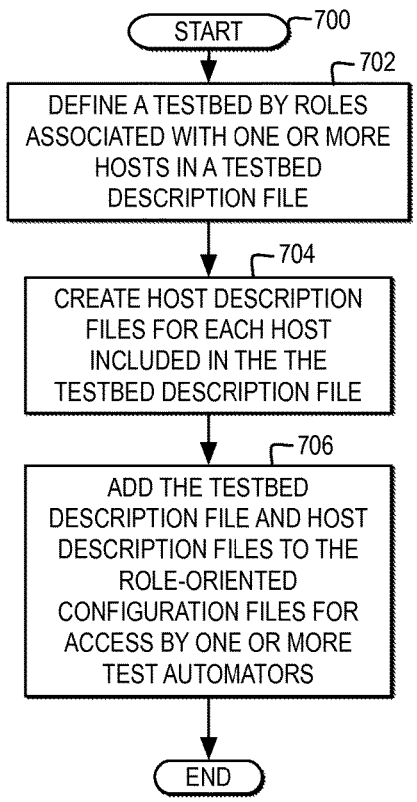
FIG. 7 illustrates a high level logic flowchart of a process and program for generating a role-oriented configuration file for a testbed.
Figure 8:
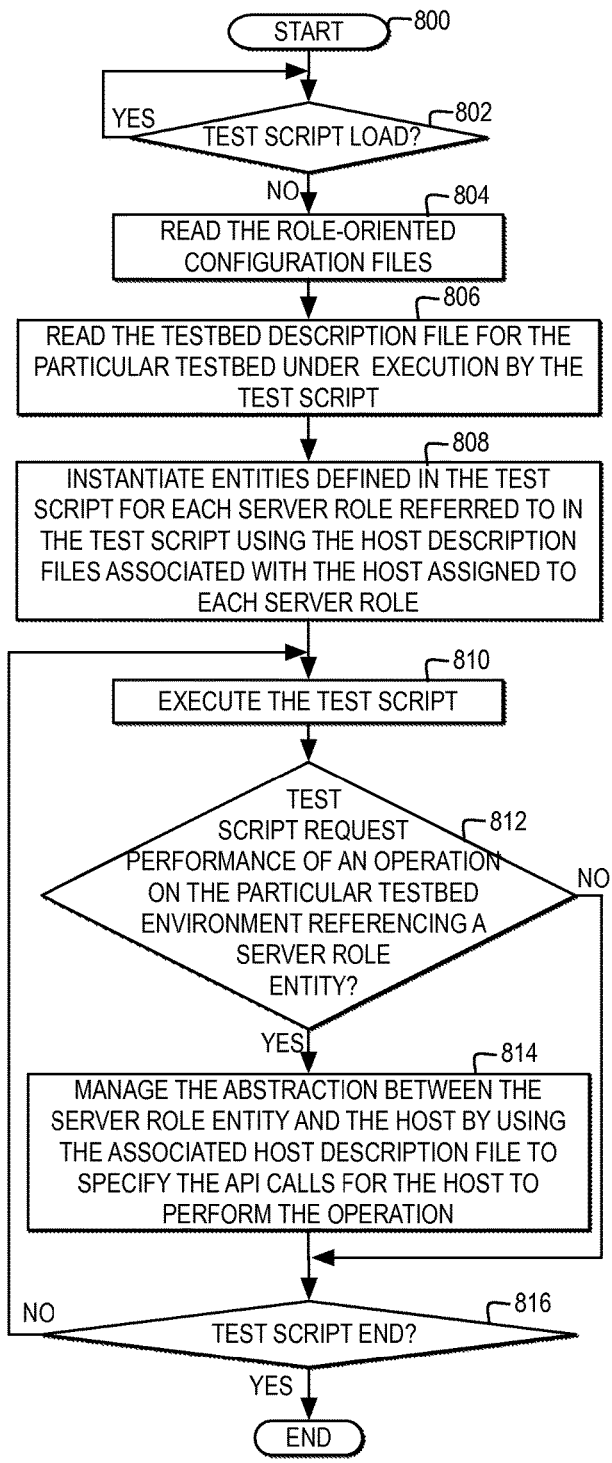
FIG. 8 illustrates a high level logic flowchart of a process and program for role-oriented execution of any test script executing on a testbed defined by role.

In one embodiment, the operations performed by processor 612 may control the operations of flowchart of FIGS. 7-8 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 618, a random access memory (RAM), such as RAM 614, a read-only memory (ROM) 616, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 600, partly on the user's computer, as a stand-alone software package, partly on the user's computer and partly on a remote computer or entirely on the remote computer or server, such as server 640. In the latter scenario, the remote computer may be connected to the user's computer through any type of network, such as network 602, through a communication interface, such as network interface 632, over a network link that may be connected, for example, to network 602.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 600, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 600, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 632, the network link to network 602, and network 802 may use electrical, electromagnetic, or optical signals that carry digital data streams. The signals through the various networks and the signals on network 602, the network link to network 602, and network interface 632 which carry the digital data to and from computer system 600, may be forms of carrier waves transporting the information.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 7 illustrates a high level logic flowchart of a process and program for generating a role-oriented configuration file for a testbed. In the example, the process starts at block 700 and thereafter proceeds to block 702. Block 702 illustrates defining a testbed by server roles associated with one or more hosts in a testbed description file. In one example, a configuration manager may detect the server roles assigned to hosts for a current network topology and create a file defining the testbed by server roles associated with one or more hosts in the testbed description file. In another example, a user may specify the server roles assigned to hosts in the testbed description file through one or more interfaces. Next, block 704 illustrates creating host description files for each host included in the testbed description file. In one example, a configuration manager automatically creates the host description files for each host based on values defined for each host. In another example, a user may specify the values in a host description file through one or more interfaces. Thereafter, block 706 illustrates adding the testbed description file and host description files for the defined testbed to the role-oriented configurations files for access by one or more test automators, and the process ends.

FIG. 8 illustrates a high level logic flowchart of a process and program for role-oriented execution of any test script executing on a testbed defined by role. In the example, the process starts at block 800 and thereafter proceeds to block 802. Block 802 illustrates a determination whether a test script is loaded. If a test script is loaded, then the process passes to block 804. Block 804 illustrates reading the role-oriented configuration files accessible to the configuration manager of a test automator, where the role-oriented configuration files may include files associated with one or more testbeds. Thereafter, block 806 illustrates reading the testbed description file for the particular testbed under execution by the test script. Next, block 808 illustrates instantiating entities defined in the test script for the each server role referred to in the test script using the host description files associated with the host assigned to each server role for the particular testbed. Thereafter, block 810 illustrates executing the test script. Next, block 812 illustrates a determination whether the test script requests performance of an operation on the particular testbed environment by referencing the server role entity. At block 812, if the test script does not request performance of an operation on the particular testbed environment by referencing the server role, then the process passes to block 816. At block 812, if the test script requests performance of the operation on the particular testbed environment by referencing the server role, the process passes to block 814. Block 814 illustrates the configuration manager managing the abstraction between the server role entity and host by using the associated host description file of the server role entity to specify the API calls by the test automator to the host to request the host perform the operation and the process passes to block 816. Block 816 illustrates a determination whether the test script has ended. At block 816, if the test script has not ended, then the process returns to block 810. At block 816, if the test script has ended, then the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to read, responsive to load of a test script, a testbed description file for a particular testbed environment under test to identify a plurality of roles each specified by a separate role identifier of a plurality of role identifiers in the testbed description file and to identify one or more hosts from among a plurality of hosts assigned to each of the plurality of roles, wherein in the test script each separate operation refers to the separate role identifier only;

program instructions to manage an interface through which a user views a logical view of the particular testbed environments displaying the plurality of hosts assigned to each of the plurality of roles;

program instructions, in response to a user selection within the interface to adjust the logic view of a particular host from among the plurality of hosts assigned to a particular role from among the plurality of roles, to adjust the testbed description file to assign the particular host to the particular role;

program instructions to instantiate, for each separate role identifier defined in the test script, a separate role identifier entity referring to a separate host description file for a separate host from among the plurality of hosts assigned to the separate role identifier in the testbed description file; and program instructions to manage, responsive to execution of the test script by an automation executor on the testbed environment, an abstraction between each separate role identifier referred to by each separate operation in the test script and each separate host currently hosting each separate role identifier for the testbed environment using the separate host description file instantiated for the separate role identifier entity for the separate host.

2. The computer system according to claim 1, the stored program instructions further comprising:

program instructions, responsive to load of the test script, to identify the particular testbed environment specified in the test script under test; and program instructions to access at least one role-oriented configuration file for the particular testbed environment specified in the test script, the at least one role-oriented configuration file comprising at least one role identification file, the testbed description file, and each separate host description file, the at least one role identification file identifying a separate type of role assigned to each of the plurality of roles for the particular testbed.

3. The computer system according to claim 2, the stored program instructions further comprising:
program instructions to access the at least one role-oriented configuration file for the particular testbed environment specified in the test script, the at least one role-oriented configuration file specified for a particular topology comprising a plurality of computer systems on which a distributed application runs within the testbed environment runs, wherein separate instances of the test script run on separate testbed environments specified by separate role-oriented configuration files.

4. The computer system according to claim 2, the stored program instructions further comprising:
program instructions to access the at least one role-oriented configuration file for the particular testbed environment specified in the test script, the at least one role-oriented configuration file specifying a separate type of role assigned to each of the plurality of roles from among a content server, a database server, and a presentation server.

5. The computer system according to claim 1, the stored program instructions further comprising:
program instructions to execute the test script.

6. The computer system according to claim 1, the stored program instructions further comprising:
program instructions to determine whether the test script requests performance of a particular operation on the particular testbed environment referencing a particular role identifier; and
program instructions, responsive to determining the test script requests performance of the particular operation on the particular testbed environment referencing the particular role identifier, to manage the abstraction between the particular role identifier referred to by the particular operation in the test script and a particular host currently hosting the particular role identifier for the testbed environment using the separate host description file instantiated for a particular role identifier entity for the particular host.

7. A method comprising:
a computer system reading, responsive to load of a test script, a testbed description file for a particular testbed environment under test to identify a plurality of roles each specified by a separate role identifier of a plurality of role identifiers in the testbed description file and to identify one or more hosts from among a plurality of hosts assigned to each of the plurality of roles, wherein in the test script each separate operation refers to the separate role identifier only;
the computer system managing an interface through which a user views a logical view of the particular testbed environments displaying the plurality of hosts assigned to each of the plurality of roles;
the computer system, in response to a user selection within the interface to adjust the logic view of a particular host from among the plurality of hosts assigned to a particular role from among the plurality of roles, adjusting the testbed description file to assign the particular host to the particular role;
the computer system instantiating, for each separate role identifier defined in the test script, a separate role identifier entity referring to a separate host description file for a separate host from among the plurality of hosts assigned to the separate role identifier in the testbed description file; and
the computer system managing, responsive to execution of the test script by an automation executor on the testbed environment, an abstraction between each separate role identifier referred to by each separate operation in the test script and each separate host currently hosting each separate role identifier for the testbed environment using the separate host description file instantiated for the separate role identifier entity for the separate host.

8. The method according to claim 7, further comprising:
the computer system, responsive to load of the test script, identifying the particular testbed environment specified in the test script under test; and
the computer system accessing at least one role-oriented configuration file for the particular testbed environment specified in the test script, the at least one role-oriented configuration file comprising at least one role identification file, the testbed description file, and each separate host description file, the at least one role identification file identifying a separate type of role assigned to each of the plurality of roles for the particular testbed.

9. The method according to claim 8, further comprising:
the computer system accessing the at least one role-oriented configuration file for the particular testbed environment specified in the test script, the at least one role-oriented configuration file specified for a particular topology comprising a plurality of computer systems on which a distributed application runs within the testbed environment runs, wherein separate instances of the test script run on separate testbed environments specified by separate role-oriented configuration files.

10. The method according to claim 8, further comprising:
the computer system accessing the at least one role-oriented configuration file for the particular testbed environment specified in the test script, the at least one role-oriented configuration file specifying a separate type of role assigned to each of the plurality of roles from among a content server, a database server, and a presentation server.

11. The method according to claim 7, further comprising:
the computer system executing the test script.

12. The method according to claim 7, further comprising:
the computer system determining whether the test script requests performance of a particular operation on the particular testbed environment referencing a particular role identifier; and
the computer system, responsive to determining the test script requests performance of the particular operation on the particular testbed environment referencing the particular role identifier, managing the abstraction between the particular role identifier referred to by the particular operation in the test script and a particular host currently hosting the particular role identifier for the testbed environment using the separate host description file instantiated for a particular role identifier entity for the particular host.

13. A computer program product comprising one or more non-transitory computer-readable storage devices and program instructions, stored on at least one of the one or more storage devices, the stored program instructions comprising:
program instructions to read, responsive to load of a test script, a testbed description file for a particular testbed environment under test to identify a plurality of roles each specified by a separate role identifier of a plurality of role identifiers in the testbed description file and to identify one or more hosts from among a plurality of hosts assigned to each of the plurality of roles, wherein in the test script each separate operation refers to the separate role identifier only;

program instructions to manage an interface through which a user views a logical view of the particular testbed environments displaying the plurality of hosts assigned to each of the plurality of roles;

program instructions, in response to a user selection within the interface to adjust the logic view of a particular host from among the plurality of hosts assigned to a particular role from among the plurality of roles, to adjust the testbed description file to assign the particular host to the particular role;

program instructions to instantiate, for each separate role identifier defined in the test script, a separate role identifier entity referring to a separate host description file for a separate host from among the plurality of hosts assigned to the separate role identifier in the testbed description file; and program instructions to manage, responsive to execution of the test script by an automation executor on the testbed environment, an abstraction between each separate role identifier referred to by each separate operation in the test script and each separate host currently hosting each separate role identifier for the testbed environment using the separate host description file instantiated for the separate role identifier entity for the separate host.

14. The computer program product according to claim 13, the stored program instructions further comprising:

program instructions, responsive to load of the test script, to identify the particular testbed environment specified in the test script under test; and program instructions to access at least one role-oriented configuration file for the particular testbed environment specified in the test script, the at least one role-oriented configuration file comprising at least one role identification file, the testbed description file, and each separate host description file, the at least one role identification file identifying a separate type of role assigned to each of the plurality of roles for the particular testbed.

15. The computer program product according to claim 14, the stored program instructions further comprising:

program instructions to access the at least one role-oriented configuration file for the particular testbed environment specified in the test script, the at least one role-oriented configuration file specified for a particular topology comprising a plurality of computer systems on which a distributed application runs within the testbed environment runs, wherein separate instances of the test script run on separate testbed environments specified by separate role-oriented configuration files.

16. The computer program product according to claim 14, the stored program instructions further comprising:

program instructions to access the at least one role-oriented configuration file for the particular testbed environment specified in the test script, the at least one role-oriented configuration file specifying a separate type of role assigned to each of the plurality of roles from among a content server, a database server, and a presentation server.

17. The computer program product according to claim 13, the stored program instructions further comprising:

program instructions to determine whether the test script requests performance of a particular operation on the particular testbed environment referencing a particular role identifier;

program instructions, responsive to determining the test script requests performance of the particular operation on the particular testbed environment referencing the particular role identifier, to manage the abstraction between the particular role identifier referred to by the particular operation in the test script and a particular host currently hosting the particular role identifier for the testbed environment using the separate host description file instantiated for a particular role identifier entity for the particular host.

* * * * *